United States Patent [19]

Brown, Jr.

[11] 4,298,214

[45] Nov. 3, 1981

[54] VEHICLE SAFETY RESTRAINT DEVICE

[76] Inventor: Milton F. Brown, Jr., P.O. Box 4570, Virginia Beach, Va. 23454

[21] Appl. No.: 37,649

[22] Filed: May 10, 1979

[51] Int. Cl.$^3$ .......................................... B60R 21/08
[52] U.S. Cl. ..................................... 280/735; 280/741
[58] Field of Search ............... 280/728, 730, 731, 732, 280/734, 735, 743, 751, 752, 753, 741, 742

[56] References Cited

U.S. PATENT DOCUMENTS

| | | | |
|---|---|---|---|
| 2,806,737 | 9/1957 | Maxwell | 280/734 X |
| 3,664,682 | 5/1972 | Wycech | 280/734 X |
| 3,774,936 | 11/1973 | Barnett et al. | 280/730 |
| 3,893,703 | 7/1975 | Chika | 280/753 |
| 4,130,298 | 12/1978 | Shaunnessey | 280/730 |

FOREIGN PATENT DOCUMENTS 2238343  7/1973  France .............................. 280/730

Primary Examiner—Robert R. Song
Assistant Examiner—Michael Mar
Attorney, Agent, or Firm—John B. Dickman, III

[57]  ABSTRACT

A vehicle safety restraint device having an improved lock and release mechanism. The vehicle safety restraint device comprises an airbag and projectable lap plate attached to rotatably mounted transverse tubes containing compressed gas or chemical inflator cartridges, all of which are housed within a container capable of being used as a visor when in an inoperative condition. An electrical impulse from an impact sensing or emergency hand switch releases the unit to rotate into a vertical position, simultaneously inflating the airbag through telescoping tubes within the bag and projecting the lap plate into the occupant's lap. The improved lock and release mechanism, which includes one or more electrically responsive explosive wire cutters and a looped locking wire, provides rapid rotation of the airbag and transverse tube. The looped locking wire holds the spring biased transverse tube in a ready position until a signal activates the wire cutters which sever the wire, thereby releasing the tube for rotation.

14 Claims, 15 Drawing Figures

VEHICLE SAFETY RESTRAINT DEVICE

BACKGROUND OF THE INVENTION

This invention relates to a vehicle restraint device for protecting occupants of a vehicle against injuries which would otherwise be suffered because of rapid deceleration of a vehicle, as in a collision.

When a vehicle is involved in an accident, there is a probability that the occupant will be thrown forward violently, striking the windshield or some other part of the vehicle, thereby sustaining injuries. In recent years several public interest groups and the Federal Government have pushed for some type of safety restraint system which could protect the occupant against such injuries and it is currently expected that all vehicles, starting with the 1981 model year, will be required to incorporate such restraint devices.

Conventional inflatable occupant restraint devices are mounted in various places in a vehicle, such as the dashboard, horn hub, the front seat back and the roof, and are inflated upon impact above a predetermined magnitude.

One occupant restraint device is described in U.S. Pat. No. 3,774,936, Barnett et al, where a roof mounted inflatable cushion is located at a predetermined position above and in front of a seated passenger. The system provides a rearward and downward restraining force and provides a cushioned barrier for the passenger through the use of a roof installed pulley and continuous loop cable system.

Another type of roof mounted airbag system is disclosed in U.S. Pat. No. 2,834,606, Bertrand, for protecting passengers from being thrown against non-yielding parts of the vehicle. Upon impact, the entire passenger compartment is filled with inflated airbags released from overhead, beneath the dashboard, from the back of the front seat and from doors.

Other roof mounted restraint devices are disclosed in U.S. Pat. Nos. 3,664,682, Wyceck, consisting of a rotatably mounted cushion and airbag inflated by tubing from an air pressure chamber, 3,753,576, Gorman, consisting of a system positioned behind the occupant which upon release curves over the occupant and encapsulates him within an airbag and an outer shield, and 3,836,168, Nonaka, which projects a net or cloth from behind to a position in front of the occupant from whence it is drawn downward and rearward by cables located within the back of the seat.

It is the primary object of the present invention to provide a safety device for the protection of an occupant when a vehicle is involved in a collision.

A further object is to provide a system of this type which is unobtrusive.

A still further object is to provide a safety restraint device which includes a protective airbag barrier and a pelvic and torso engaging restraint to restrain forward and upward motion of the occupant in case of an accident.

Another object of this invention is to provide a lock and release mechanism for a vehicle safety restraint device which is compact and with few moving parts.

Another object of this invention is to provide a lock and release mechanism for a vehicle safety restraint device which will rapidly release the safety restraint device when activated.

Other objects and advantages of the invention will be apparent from the following description.

SUMMARY OF THE INVENTION

The present invention provides an occupant restraint device for protecting the occupant of a vehicle in the event of a collision, said device comprising:

a. a confining means adapted for use in confining a vehicle occupant in close proximity to a seat, the confining means being housed in a container rotatably mounted to the vehicle roof;

b. the confining means including an airbag with internal telescoping tubes extending through the airbag and attaching to a restraining pelvic and torso engaging means which upon projection from the container are positioned in front of the occupant and provide rearward and downward force;

c. a sensing means adapted to activate a gas releasing or generating means upon detecting an impact;

d. a looped locking means for holding the occupant restraint device in a ready condition on the vehicle roof;

e. a release mechanism responsive to an electrical signal for severing the looped locking means; and f. an electrical activator for operating the release mechanism in response to a command.

DETAILED DESCRIPTION OF THE INVENTION

The present invention will now be described with reference to the accompanying drawings in which.

DESCRIPTION OF THE PREFERRED EMBODIMENT

Figure 1:
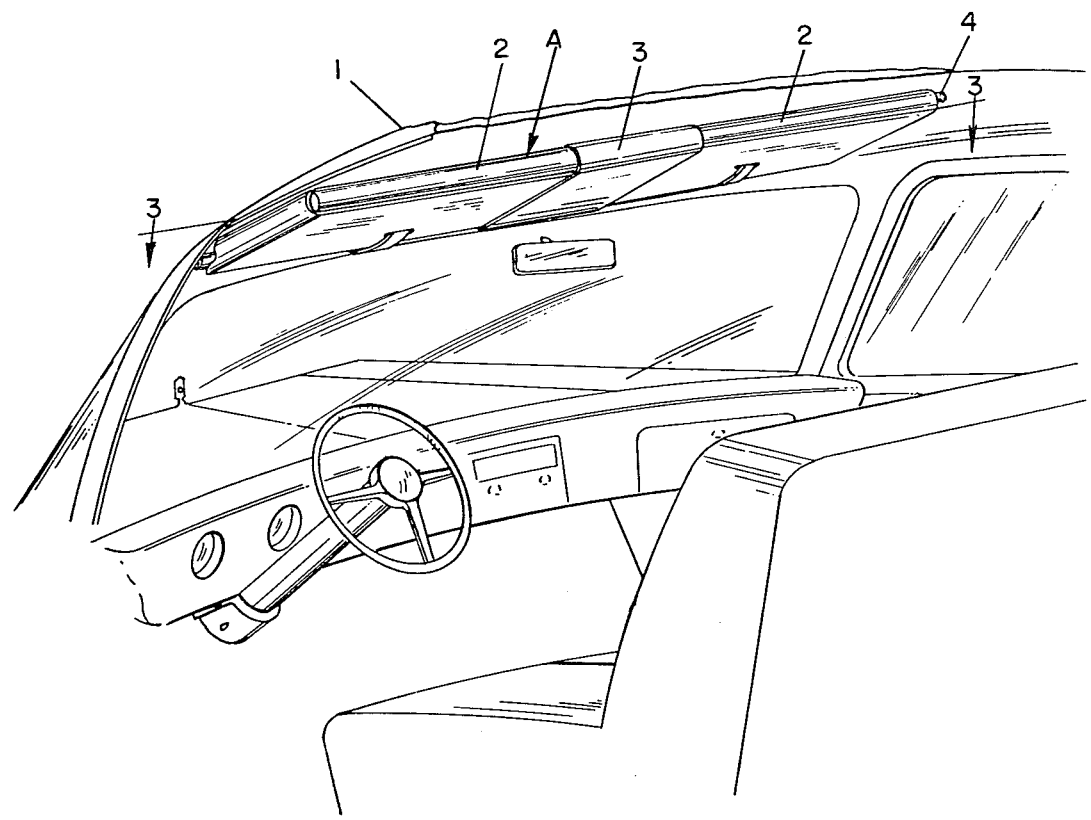
FIG. 1 is a perspective view of the front interior of an automobile showing the safety restraint device of this invention.
Figure 2:
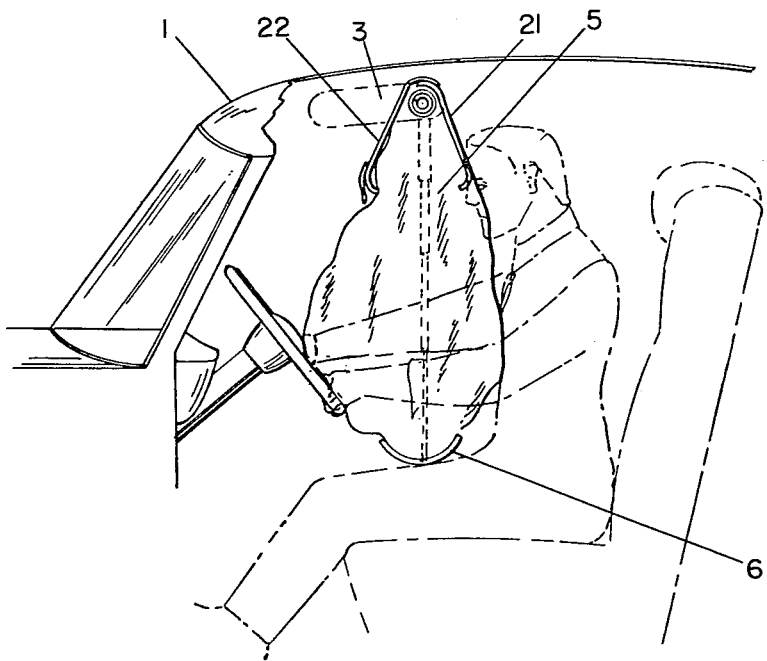
FIG. 2 is a side cutaway view of an automobile showing the safety restraint device of this invention after extension and inflation.
Figure 3:
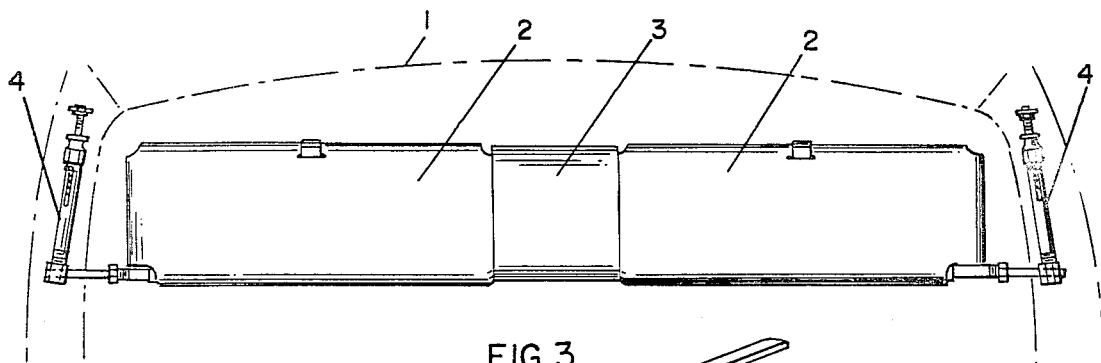
FIG. 3 is a cutaway view of an automobile from above showing the safety restraint device of this invention as installed.

Referring to the drawings, FIGS. 1 and 2 show the vehicle safety restraint device A mounted in close proximity to the roof or overhead of a vehicle 1. There are two container units 2 connected to a center console unit 3. The safety restraint device is attached to the automobile by center console unit 3 located along the longitudinal center line of the vehicle and best shown on FIG. 3. The center console 3 and holding members 4 have absorption springs, not shown, to provide for limited forward movement upon impact.

In FIG. 2 the safety restraint device is shown in an activated position with an airbag 5 in front of the occupant and an extended lap plate 6 pushing down and back, restraining forward and upward movement by the occupant.

Figure 4:
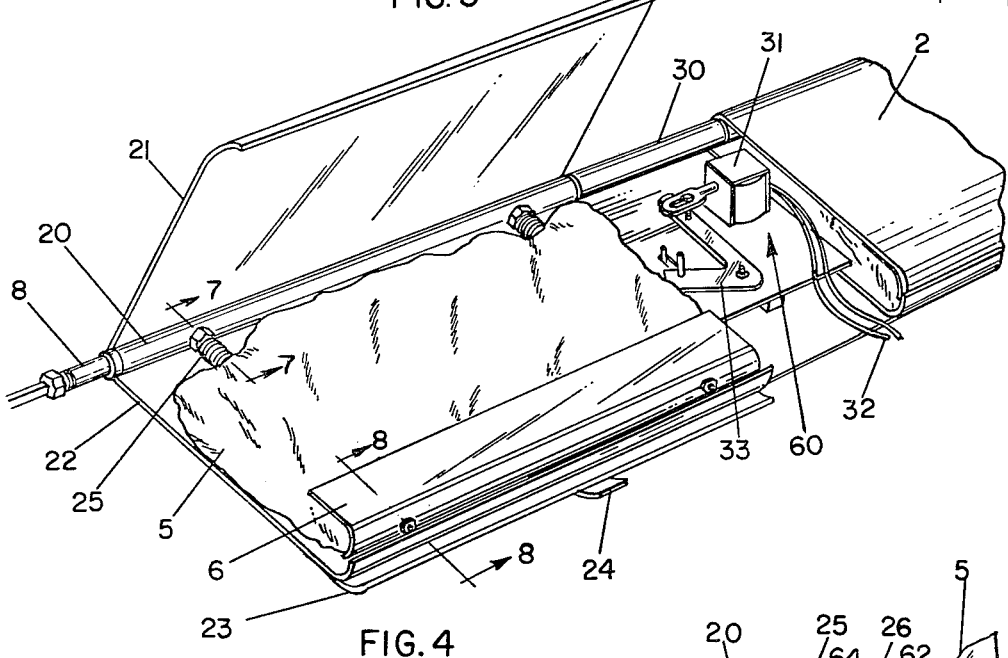
FIG. 4 is a partial perspective view of the safety restraint device.
Figure 5:
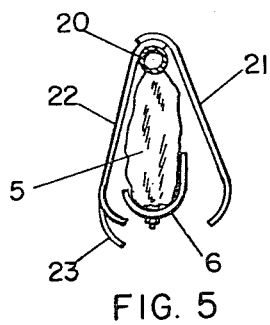
FIG. 5 is a side view of the safety restraint device at the commencement of extension and inflation.
Figure 6:
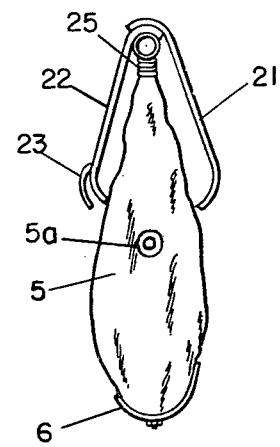
FIG. 6 is a side view of the safety restraint device after full extension and partial inflation.

The airbag 5 is best shown in FIGS. 4–6. Each container unit 2 includes a top 21, which may be semiflexible or have a padded exterior, and a bottom 22. The top 21 and the bottom 22 are held in a closed position by a clasp 23 and a latch 24 located on one end and having a rotatable attachment to a transverse tube 20 at the opposite end. FIG. 5 shows the container 2 partly open and the airbag in a deflated position. In FIG. 6, the container 2 is open, the airbag is partially inflated and lap plate 6 is fully extended.

Turning again to FIG. 4, the cover of the center console has been removed to show the safety restraint activating unit of my pending application Ser. No. 921,085, filed June 30, 1978. The safety restraint activating unit of my prior application is replaced by the improved lock and release mechanism which is the subject matter of the present invention. In the prior activating unit, center tube 30 contains a concealed torsion spring 38, shown in FIG. 11, which is released to rotate by electromechanical control system 60. A solenoid 31 is connected by leads 32 to an impact sensing switch which is mounted in the front end of the vehicle, and, if desired, to an emergency manual switch mounted on the dashboard. An electrical impulse to solenoid 31 operates the release lever 33. As shown in FIGS. 11–15, an improved lock and release mechanism 100 is used in lieu of electromechanical control system 60. The improved system includes an explosive wire cutter 102 and a looped locking wire 104 attached to center console 3. An electrical impulse to the explosive cutter 102 shears wire 104 which releases center tube 30 to rotate. Electro-mechanical system 60 will be discussed in detail later on. It should be noted at this point that the electro-mechanical system 60 of my co-pending application can be locked and released repeatedly, without replacement of parts but requires approximately twice as much space as the improved lock and release system 100. The lock and release system 100 does require the replacement of cutter 102 and looped locking wire 104 with each use of the restraint system.

Figure 7:
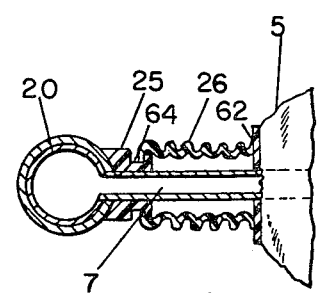
FIG. 7 is a sectional view taken along line 7—7 of FIG. 4.
Figure 8:
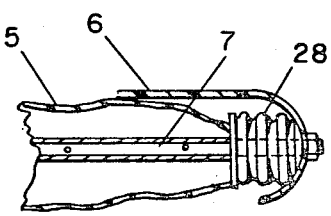
FIG. 8 is a sectional view taken along line 8—8 of FIG. 4.

FIGS. 7 and 8 show the connection of airbag 5 and telescoping tube 7 to transverse tube 20 on one end and to lap plate 6 on the opposite end. FIG. 7 shows transverse tube 20 with a telescopic tube and bag attachment piece 25. A telescopic tube 7 made of metal or plastic is fitted within and attached to attachment piece 25, which may be welded or otherwise fastened and sealed to transverse tube 20. Airbag 5 is slipped over the telescoping tube 7 and fastened around the outer surface of attachment piece 25 by means of flexible tube 26, which may be an integral part of the airbag or attached and sealed to the airbag. FIG. 8 shows a lap plate attachment piece 28 into which the free end of the telescoping tube 7 is fitted. The other end of airbag 5 is similarly attached by flexible tubing around lap plate end piece 28. Lap plate end piece 28 may be an integral part of lap plate 6 or otherwise attached by well known means. The lap plate 6 is a "J" shaped piece of rigid plastic or metal with rounded turn-ins on each end. When extended, lap plate 6 extends laterally across approximately one half of the vehicle seat. The lap plate 6 may be made of two or more slidably interlocking pieces which extend to greater width upon extension of telescoping tubes arranged on a diverging angle or by expanding force by closely placed airbags 5.

Figure 9:
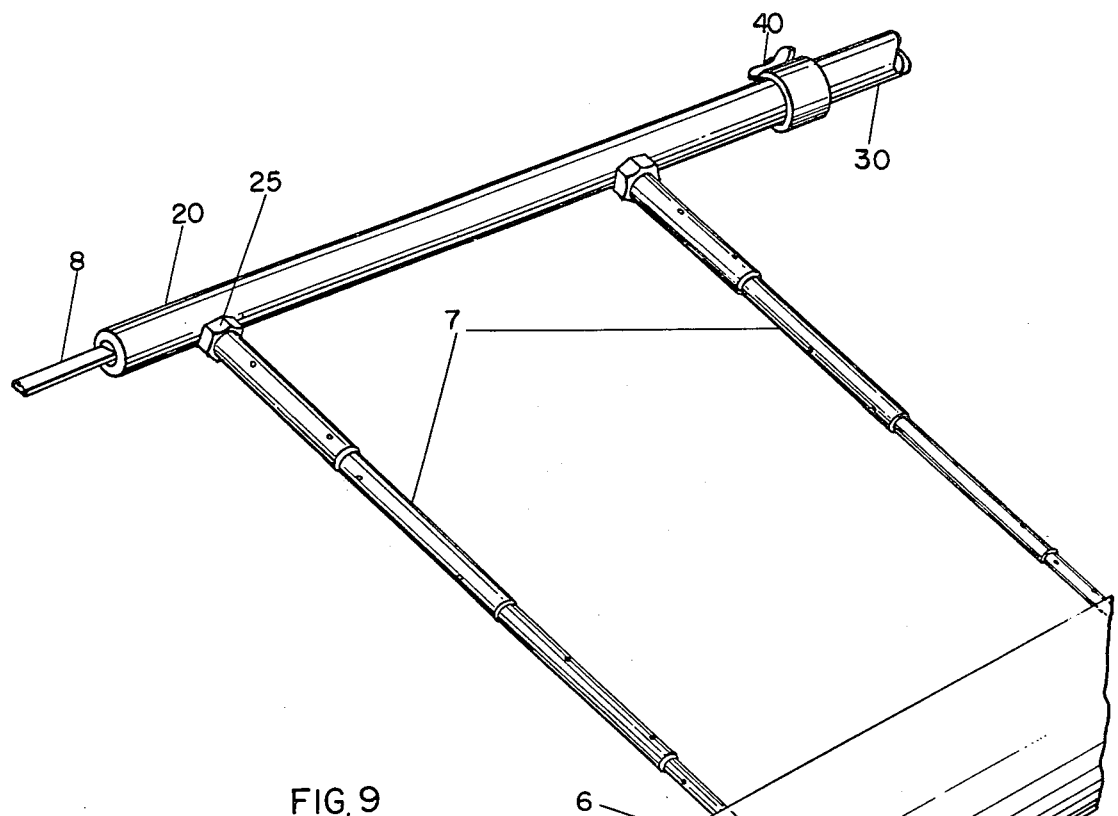
FIG. 9 is a perspective view of the telescoping tubes and lap plate of this invention.

FIG. 9 shows the transverse tube 20 with attached and extended telescoping tubes 7 and attached lap plate 6 with surrounding airbags 5 removed. Perforations in the walls of telescoping tubes 7 permit rapid release of gas released within transverse tube 20 upon extension of telescoping tube 7. The rapidity of extension before airbag inflation can be controlled and varied by the selection of telescoping tube segments which are perforated or unperforated. Further, the degree of resistance to upward movement may be varied by location of the perforations. For example, the location of the perforations in the smallest and inmost segment of the telescoping tube results in the most rapid extension and greatest resistance to upward movement. When pyrotechnic chemicals are used as inflators, a longer passage for the hot gases prior to release into the surrounding airbag is needed to avoid damage to the airbag and this is best achieved by location of perforations in the inmost segment.

Figure 10:
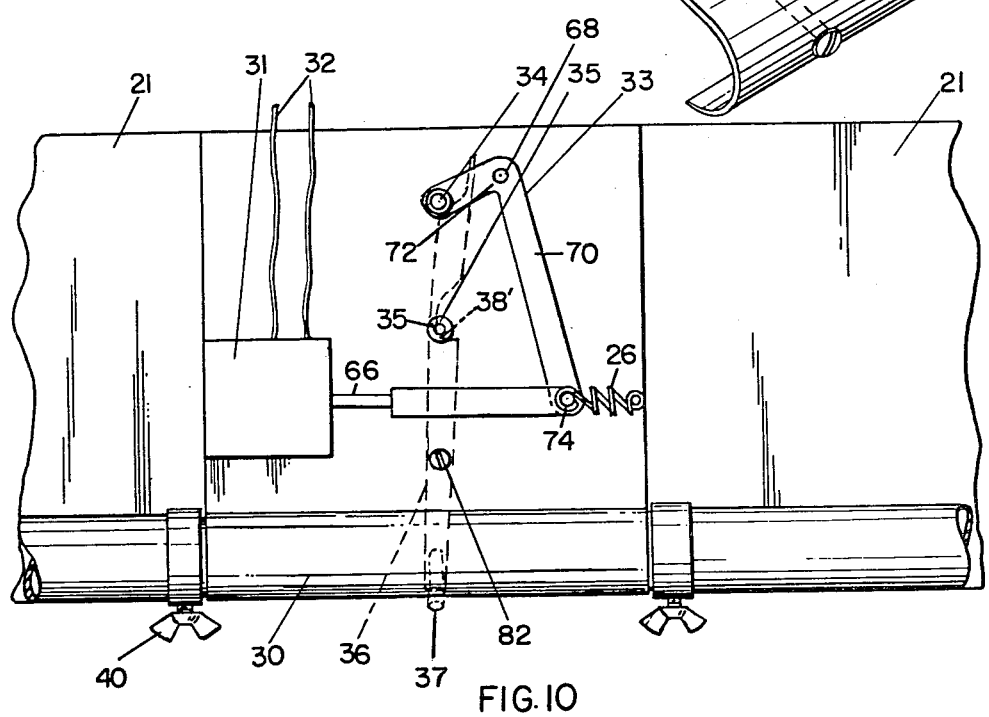
FIG. 10 is a top plan view of the center lock and release unit of the safety restraint device.

FIGS. 10–15 are directed to the locking and release mechanism of the safety restraint device A. FIG. 10 shows the release mechanism of my copending application in which a latch 36 connected to lever arms moved by solenoid 31 holds center tube lug 37 in a locked position and upon electrical impulse to solenoid 31, lug 37 is released permitting rotation of tube 30 rotatably held by center console 3. FIG. 10 shows one type of spring latch 36, in which there is a depression 36' and camming surface along one edge of the latch and another depression 38' and camming surface on the opposite edge. The latch rotates about pivot pin 82. FIGS. 11–15 show my improved lock and release mechanism 100 in which tube lug 37 is held in a locked position by looped wire 104 which is severed upon electrical impulse to explosive wire cutter 102, commercially available, thereby releasing lug 37 to permit rotation of center tube 30.

Referring to FIG. 10, solenoid 31 is connected by electrical leads 32 to an impact sensor, not shown. Solenoid 31 has a retractable rod 66 which connects to release lever 33. Release lever 33 is pivotally connected to center console 3 by pivot pin 68. The lever arm 33 has a long arm 70 and a short arm 72. Solenoid rod 66 is connected to long arm 70 by engaging pin 74. Holding the solenoid rod 66 in the extended position is a spring 76 which yields when the solenoid is actuated. Short arm 72 engages a slidably mounted locking pin 34 which locks latch 36 in a closed position against center tube lug 37, thereby preventing the rotation of center tube 30 by torsion springs 38 within tube 30. Movement of short arm 72 moves locking pin 34 in a depression 36' located in the rearward end of latch 36 and simultaneously pulls a connected push pin 35 against an increas-angle on the side of latch 36, giving latch 36 a turning movement. Latch 36 pivots about pin 82 in console 3. The simultaneous unlocking movement of pin 34 and turning force of pin 35 applied to latch 36 releases tube lug 37 which is dynamically balanced against the end of latch 36. Center tube lug 37 upon release rotates through an angle of ninety degrees before striking a stop in center console 3 (not shown). Torsion springs 38 contained within center console spring tube 30 provide rotational force upon tube lug 37.

Figure 15:
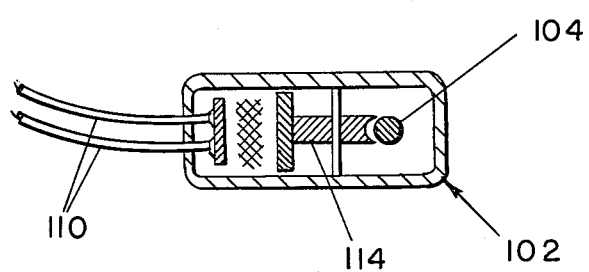
FIG. 15 is a cross section view of the improved release mechanism taken along the line 15—15 of FIG. 13.

Referring to FIGS. 11–15, center tube lug 37 is held in a locked position by looped lug wire 104 which is fastened at the bottom end of the loop to stud 106 fastened to center console 3. directly below the locked position of tube lug 37. One side of lug wire 104 passes through explosive wire cutter 102, as shown in FIG. 15. The wire cutter 102 is fastened into position on center console 3 by clamp 108. Electrical leads 110 connect explosive wire cutter 102 to an impact sensor located elsewhere and not shown. Upon electrical impulse to wire cutter 102, detonation drives a cutter head 114 against lug wire 104, severing the wire and permitting lug 37 to rotate under the force of torsion springs 38 located within center tube 30.

Figure 11:
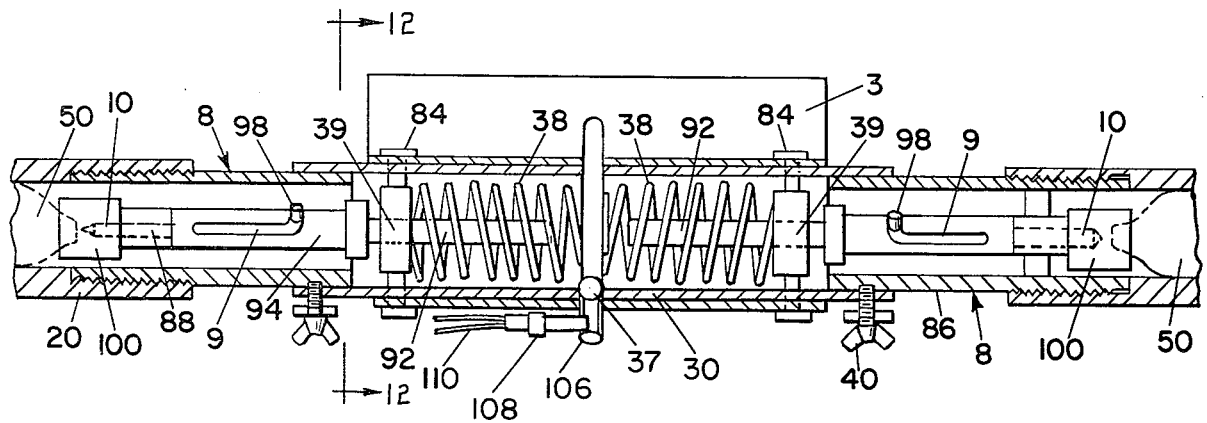
FIG. 11 is a sectional view of the improved center unit lock and release mechanism of the invention.

As shown in FIG. 11, torsion springs 38 contained within center console spring tube 30 are attached at one end to tube lug 37 at the center of tube 30 and to slotted inserts 39 at each end of spring tube 30. The rotation of center spring tube 30 through an angle of ninety degrees also rotates containers 2 which are connected to tube 30. Such rotation of containers 2 beyond a predetermined angle below the horizontal serves to activate airbags 5 and extend telescoping tubes 7 and lap plate 6 by means of a firing assembly 8 on the end of container 2, as will be more fully explained later.

Figure 12:
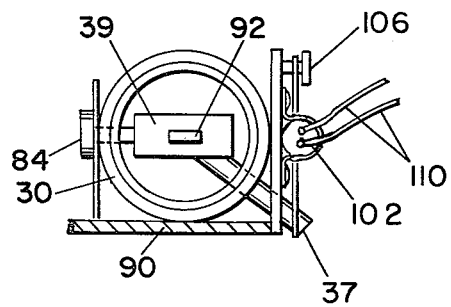
FIG. 12 is a sectional view of the improved center unit lock and release mechanism of the invention taken along the line 12—12 of FIG. 11.
Figure 13:
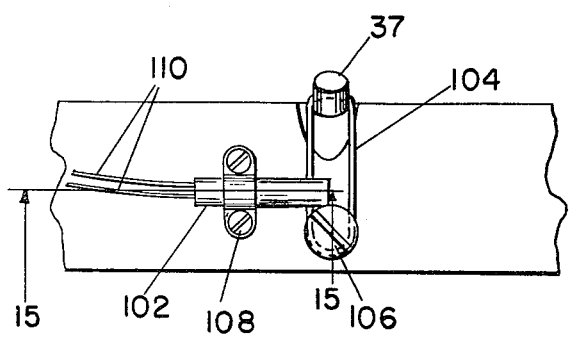
FIG. 13 is a partial elevation of the improved center unit lock and release mechanism.
Figure 14:
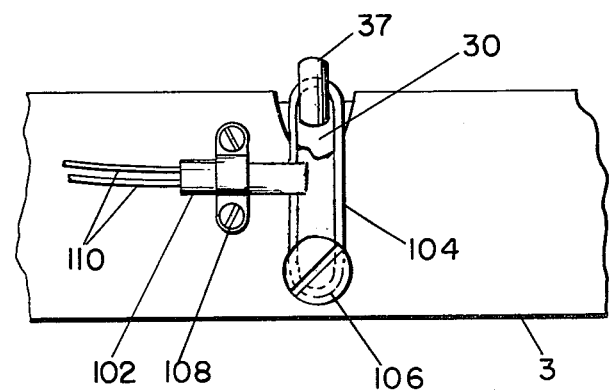
FIG. 14 is an enlarged partial elevation of the improved center lock and release mechanism after activation of mechanism.

As shown in FIGS. 11 and 12, center console spring tube end pieces 39 are slotted and are mounted within center console tube 30 by bolts 84 running through annular slots in tube 30 and fixed to flanges on the face of center console 3. Slotted end pieces 39 are held in a fixed plane during rotation of spring tube 30. The slots in end pieces 39 receive and hold firing pin rod flat ends 92, extending from firing assembly 8, in a laterally slidable plane.

FIG. 11 shows firing assembly 8 which is attached into the end of transverse tube 20 of the container 2. The outer end of firing assembly 8 is slipped into center console spring tube 30 and held in position in a vertical plane within tube 30 by friction screw 40 which engages an annular slot or groove in wall of outer tube 86 of firing assembly 8. Such groove in outer tube 86 permits rotation of containers 2 through an angle of 55 degrees relative to center console spring tube 30, thereby permitting container 2 to be used as a visor. When containers 2 are in a position from one to fifty-five degrees below a horizontal plane, rotation of center console spring tube 30 will continue the rotation of container 2 to an approximately vertical position and activate the firing assembly when containers 2 have moved beyond the predetermined angle.

Firing assembly 8 consists of an outer tube 86, an inner tube rod and firing pin holding assembly 88, a rod 12 with a flanged inner end serves as a hammer. A flat outer end 92 engages a slotted center console spring tube end piece 39, and a rod lug 98 moves within the pattern of an L shaped slot in inner tube 94, there is a compression spring 11, an outwardly tapering firing pin 10, and an annular inner tube support ring 90 and a firing pin and cartridge holder 100. A $CO_2$ or pyrotechnic chemical cartridge 50 is screwed into threads in the end of firing pin and cartridge holder 100 and holder 100 is screwed into threads inside tube 94 of inner tube assembly 88. Inner tube assembly 88 is fitted within outer tube 86 and annular support 90. Outer tube 86 is screwed or otherwise locked and sealed in the end of transverse tube 20 which receives and hold cartridges 50. Upon rotation of center console spring tube 30, firing assembly 8 attached within tube 30 is rotated around rod 12, the flat end 92 of which is held in a horizontal plane by center console spring tube 39. Rotation of firing assembly 8 beyond a fifty-five degree angle releases rod lug 98 to move laterally within slot 9 under force supplied by compression spring 11. The flanged hammer end of rod 12 strikes the protruding end of firing pin 10, driving it against and piercing or detonating cartridge 50 within transverse tube 20. The released or generated gases from cartridge 50 drive firing pin 10 back into a locked and sealed position, thereby permitting the gases to escape only into telescoping tubes 7 and surrounding airbags 5.

In operation, an electrical impulse from the impact sensor to either solenoid 31, or to wire cutter 102 where the improved lock and release mechanism is utilized, releases spring tube lug 37 which is held in a static energy position by latch 36, or by lug wire 104 where the improved lock and release mechanism is employed. Upon activation of solenoid 31, release lever 33 is pivoted, moving torsions spring latch 36 out of a locked position with lug 37 and permitting lug 37 to rotate ninety degrees. Upon activation of wire cutter 102, where the improved lock and release mechanism is incorporated, explosives within the wire cutter drive a shear pin against wire 104 looped over lug 37 and holding it in a locked position, thereby severing looped wire 104 and permitting lug 37 to rotate ninety degrees. Rotation of spring tube lug 37 also rotates center console spring tube 30 and containers 2 connected to spring tube 30 by firing assembly 8, as described. When the firing assembly 8 and containers 2 are moved more than 55 degrees, firing assembly 8 is activated, thereby piercing or detonating cartridge 50 within transverse tube 20 of containers 2. Gases from cartridge 50 escape into telescoping tubes 7, extending the tubes and passing through apertures in the tubes 7 into airbags 5, inflating said airbags. The wire 104 may be made of metal, plastic, tape or the like. The extending force of telescoping tubes 7 and lap plate 6, and the expanding force of airbags 5 press open containers 21 and 22, overriding clasp 23 and latch 24. (FIG. 4) The rotation, extension and expansion movement of safety restraint device "A" places it in a position between the occupant and the forward fixed elements of the vehicle and provides a positive downward hold by lap plate 6 on the pelvic and lower abdomen to prevent forward or upward violet movement. In case an adult occupant's forehead is forced forward by the impact against the padded or semiflexible top cover 21, the top cover is driven against the upper end of airbag 5, absorbing energy from the forward force. In high speed accidents the entire safety restraint device A will move forward for a distance of one to two inches under heavy impact, restrained by means of springs or compressible material attached to center console 3 and end holding pieces 4. Where 2 or more airbags are used and interconnected through transverse tube 20, the force of the body against one airbag 5 is partially transferred to and absorbed by another airbag 5. Further, the force of the body against airbag 5 results in further extension of telescoping tubes 7 and lap plate 6, providing a greater hold down pressure and absorbing a part of the energy. Such transfer of loads enables the use of lighter airbag materials to absorb energy without rupture. In use, airbag 5 may contain one or more flapper valves 5a (see FIG. 6) along one or both sides. Such valves enable the intake of air upon rapid extension of the bag by telescoping tubes 7, sealing the bag upon inflation, and release of pressure from all interconnected airbags upon depression of the flapper valve by the occupant or rescue personnel.

While only one embodiment of the invention is shown, various changes and modifications may be made without departing from the spirit of the invention, therefore the invention should be defined by the following claims.

I claim:

1. A vehicle safety restraint for protecting occupants of a vehicle comprising
   a. a confining means adapted in use for confining the upward and forward movements of an occupant of a vehicle;
   b. a container means mounted to the interior overhead of a vehicle for containing said confining means;
   c. said confining means including at least one airbag and at least one extending torso and pelvic engaging safety restraint which are released from said container means upon application of extending and expanding forces;
   d. a spring biased rotatable transverse tube supporting said container means in a ready position on the interior overhead of a vehicle;
   e. a looped locking means for holding said rotatable transverse tube in a static ready condition;
   f. a means for removing said looped locking means to release said rotatable transverse tube from a static ready condition to a kinetic condition;
   g. an activating means responsive to a selected condition adapted to activate said means for removing said looped locking means;
   h. said container means including top and bottom covers which open upon actuation of said air bag and said torso and pelvic engaging restraint by said extending and expanding forces.

2. The safety restraint of claim 1 wherein said rotatable tube is hollow and connects to said airbag and torso engaging restraint.

3. The safety restraint of claim 2 wherein said rotatable means is rotated by said actuating tube.

4. The safety restraint of claim 3 wherein said torso and pelvic engaging means is at least one telescoping means with a torso and pelvic engaging end.

5. The safety restraint of claim 4 wherein the telescoping means is inserted into a surrounding airbag.

6. The safety restraint of claim 4 wherein said activating means includes a time delay means for filling said airbag and extending said torso and pelvic engaging means.

7. The safety restraint of claim 6 having a firing assembly means for piercing compressed gas or detonating pyrotechnic chemical cartridges with a tapered firing pin for inflating said airbag, said firing pin being driven into a locked and sealed position by escaping gases.

8. The safety restraint device of claim 6 wherein said looped locking means is an endless wire.

9. The safety restraint device of claim 8 wherein said means for removing said looped locking means is at least one wire cutter.

10. The safety restraint device of claim 9 wherein said wire cutter is explosively operated.

11. The safety restraint device of claim 10 wherein said explosively operated one or more wire cutters are activated by an electric signal.

12. The safety restraint as set forth in claim 1 in which a fixed tube within a rotatable outer tube or bracket is fixed to a surface member, said inner tube having a vertical stud passing through an annular slot in the outer tube or bracket and rotatable through said slot, one or more torsion springs within or surrounding said rotatable tube attached at one end to the rotatable tube stud and at the opposite end to a bolt passing through the outer tube or bracket flanges and annular slots in the rotatable tube, and a locking means which engages and holds the rotatable tube stud and rotatable tube under spring tension and releases the tube and stud upon electrical impulse to an unlocking means.

13. The safety restraint as set forth in claim 12 in which said locking means engages and holds the rotatable tube stud and inner tube in a locked position under spring tension and releases said stud and tube upon electrical impulse to a solenoid which is linked to one end of said latch.

14. The safety restraint as set forth in claim 12 in which a looped strap, wire or the like, passes over the rotatable tube stud and is fastened on the opposite end to the outer tube or bracket, and an explosive actuated cutter which engages said looped strap, wire or the like, and cuts same upon electrical impulse to the explosive charge, releasing the rotatable tube stud and tube to rotate under spring tension.

* * * * *